United States Patent
Hirata et al.

[11] Patent Number: 6,031,839
[45] Date of Patent: *Feb. 29, 2000

[54] DATA COMMUNICATION SYSTEM AND COMMUNICATION TERMINAL EQUIPMENT

[75] Inventors: Shoichi Hirata, Higashiyamato; Ichiro Okajima, Yokohama; Noriko Uchida, Yokohama; Masumi Sotoyama, Yachiyo, all of Japan

[73] Assignee: NTT Mobile Communications Network, Minato-ku, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/702,505
[22] PCT Filed: Dec. 28, 1995
[86] PCT No.: PCT/JP95/02756
§ 371 Date: Sep. 4, 1996
§ 102(e) Date: Sep. 4, 1996
[87] PCT Pub. No.: WO96/21298
PCT Pub. Date: Jul. 11, 1996

[30] Foreign Application Priority Data
Jan. 5, 1995 [JP] Japan .................................... 7-000394

[51] Int. Cl.[7] .............................. H04L 12/56; H04L 12/28
[52] U.S. Cl. ......................... 370/409; 370/420; 709/245; 711/203
[58] Field of Search ..................................... 370/349, 396, 370/400, 401, 402, 407, 408, 409, 389, 420; 340/825.52; 709/245; 711/202, 203

[56] References Cited

U.S. PATENT DOCUMENTS

| | | | |
|---|---|---|---|
| 5,067,123 | 11/1991 | Hyodo et al. | 370/396 |
| 5,276,441 | 1/1994 | Katsurada | 340/825.52 |
| 5,287,103 | 2/1994 | Kasprzyk | 340/825.52 |
| 5,329,527 | 7/1994 | Ujihashi et al. | 370/401 |
| 5,740,231 | 4/1998 | Cohn | 379/89 |

FOREIGN PATENT DOCUMENTS

| | | |
|---|---|---|
| 61-63130 | 4/1986 | Japan . |
| 1-208004 | 8/1989 | Japan . |
| 1-208044 | 8/1989 | Japan . |
| 4-227149 | 8/1992 | Japan . |
| 5-083260 | 4/1993 | Japan . |
| 5-153136 | 6/1993 | Japan . |
| 6-104902 | 4/1994 | Japan . |
| 6-149689 | 5/1994 | Japan . |
| 6-164576 | 6/1994 | Japan . |
| 6-177887 | 6/1994 | Japan . |
| 6-337824 | 12/1994 | Japan . |

*Primary Examiner*—Alpus H. Hsu
*Assistant Examiner*—Afsar M Qureshi
*Attorney, Agent, or Firm*—Brinks Hofer Gilson & Lione

[57] ABSTRACT

A data communication system in which a data communication address for a communication terminal can arbitrarily be changed whenever the communication terminal is used. This data communication system includes a database 60 for storing a corresponding relation between an identifier 41 of a communication terminal 40 and a plurality of data communication addresses used for the communication. The database 60 stores a corresponding relation between the identifier 41 of the communication terminal and the data communication addresses during a period of use thereof in accordance with instructions from the communication terminal 40. When incoming data is received that is directed to certain data communication address, a network switching device 50 obtains an identifier corresponding to the certain data communication address and transmits the data to the communication terminal with the identifier.

9 Claims, 5 Drawing Sheets

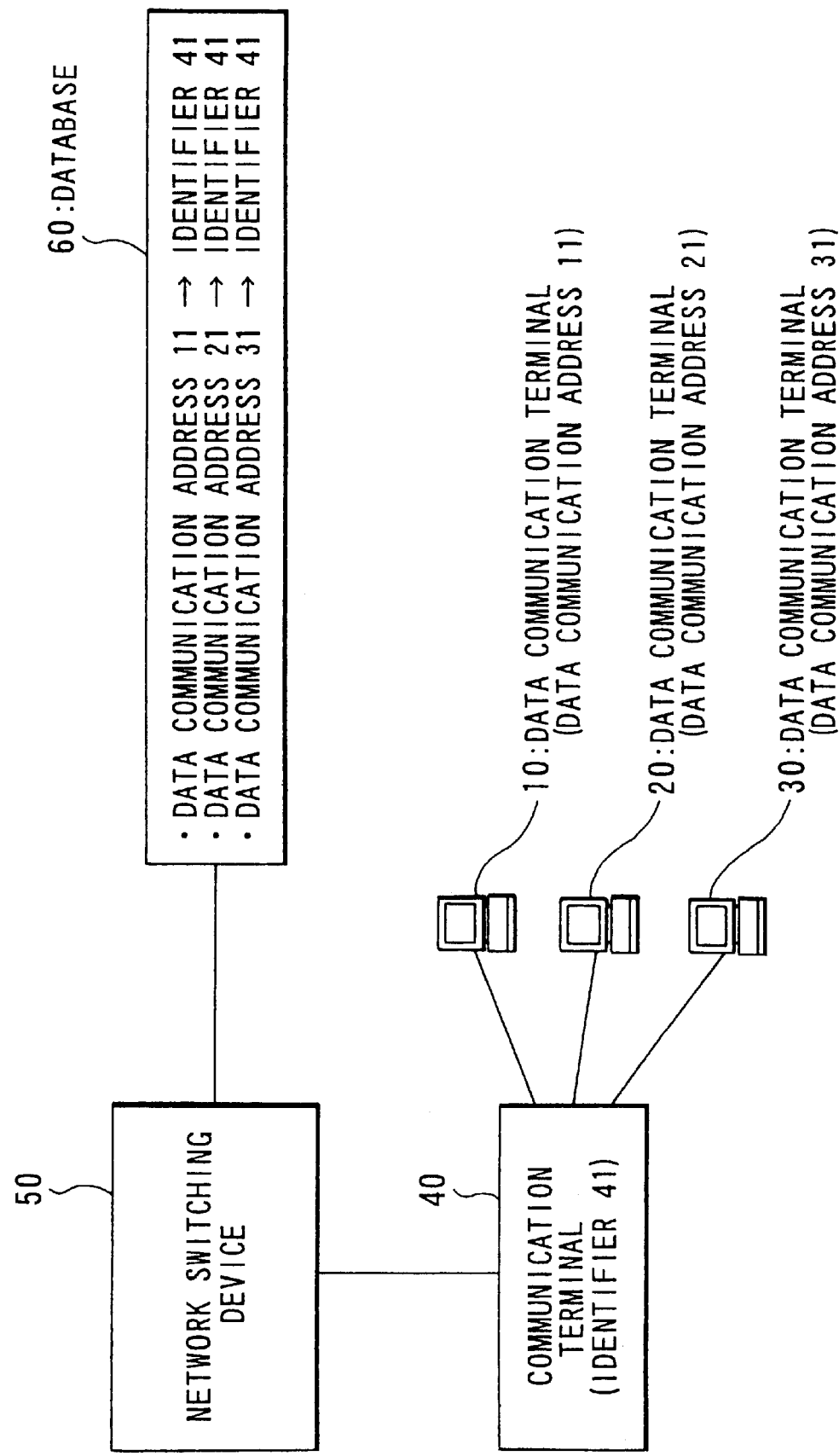

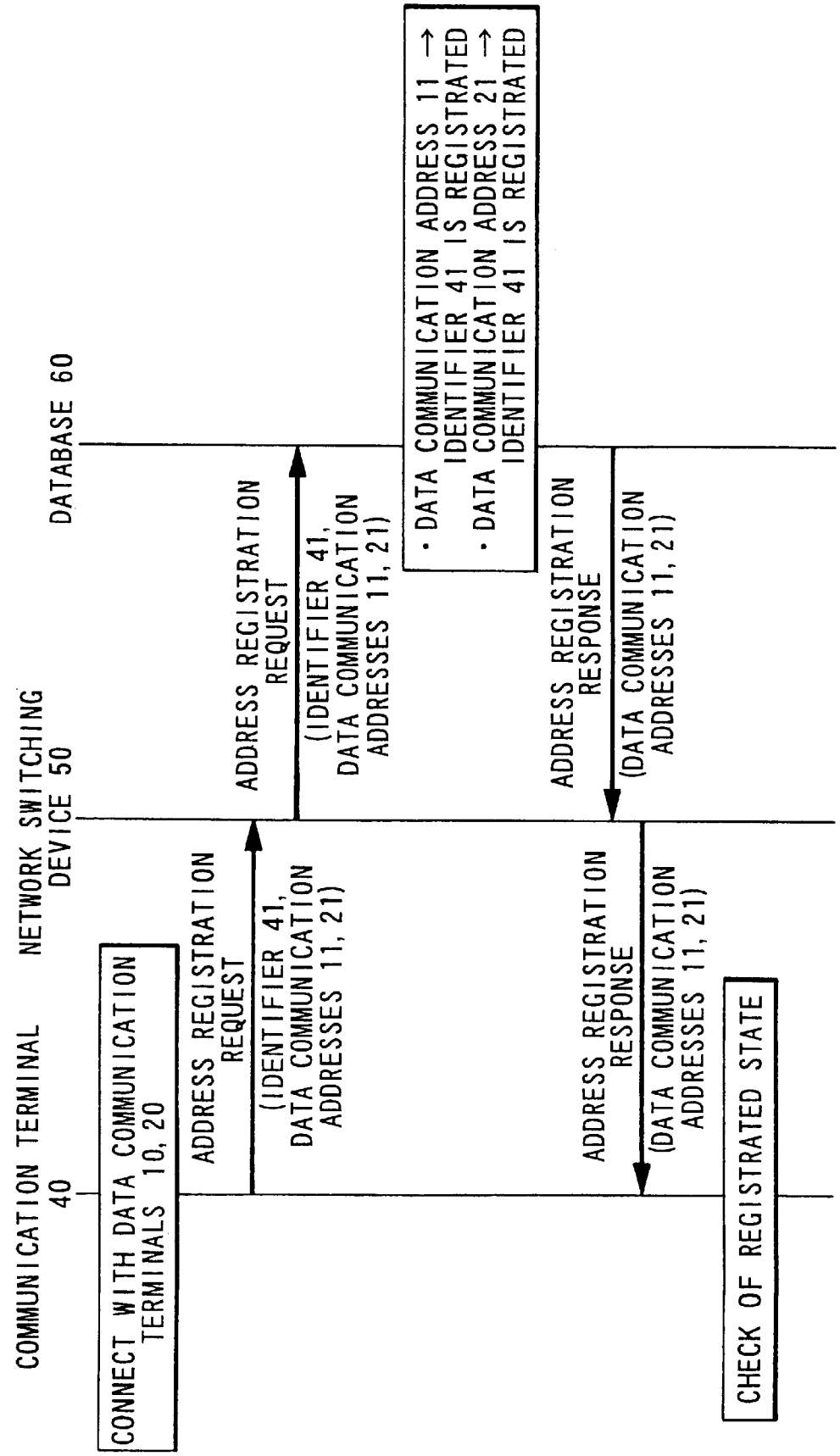

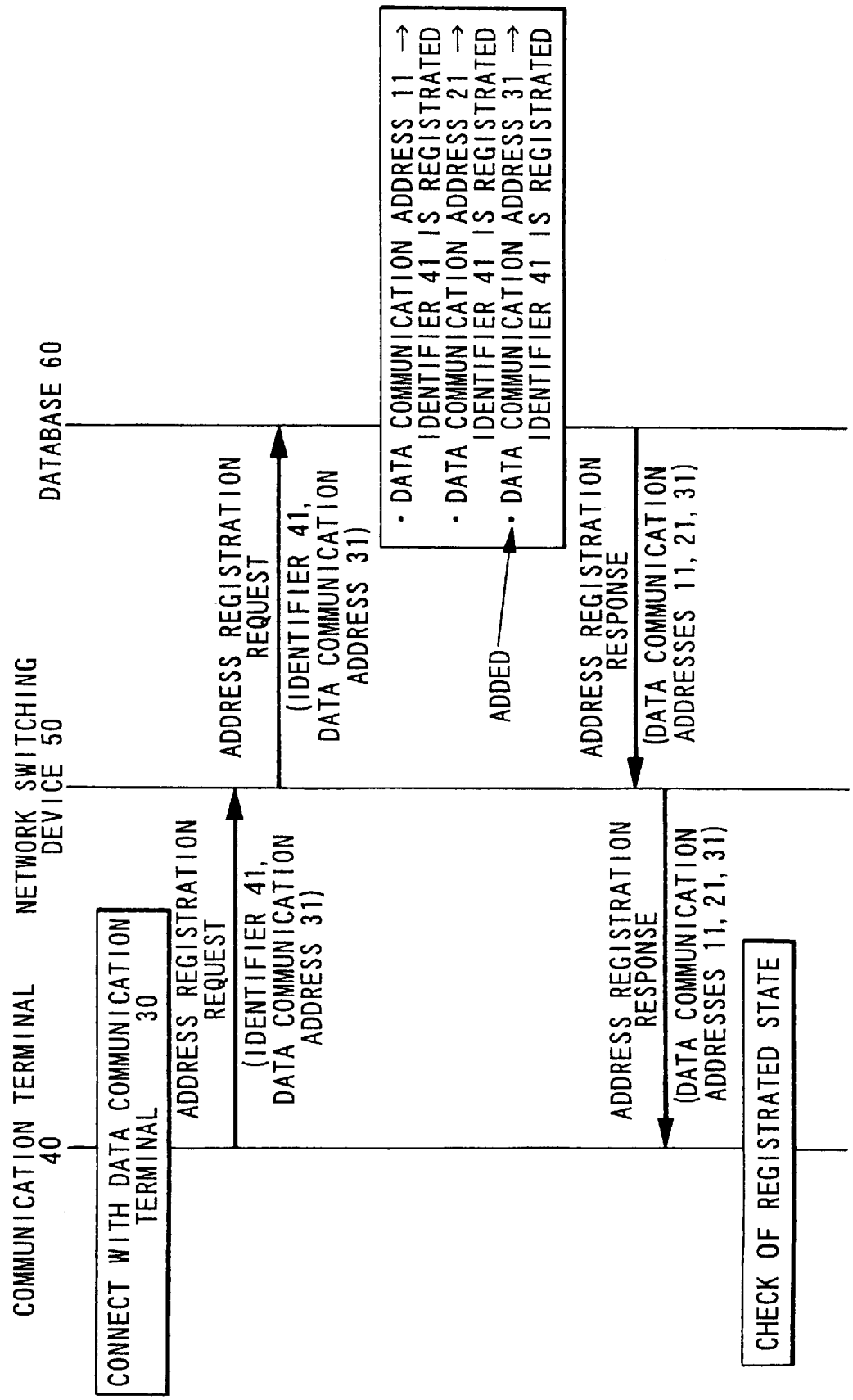

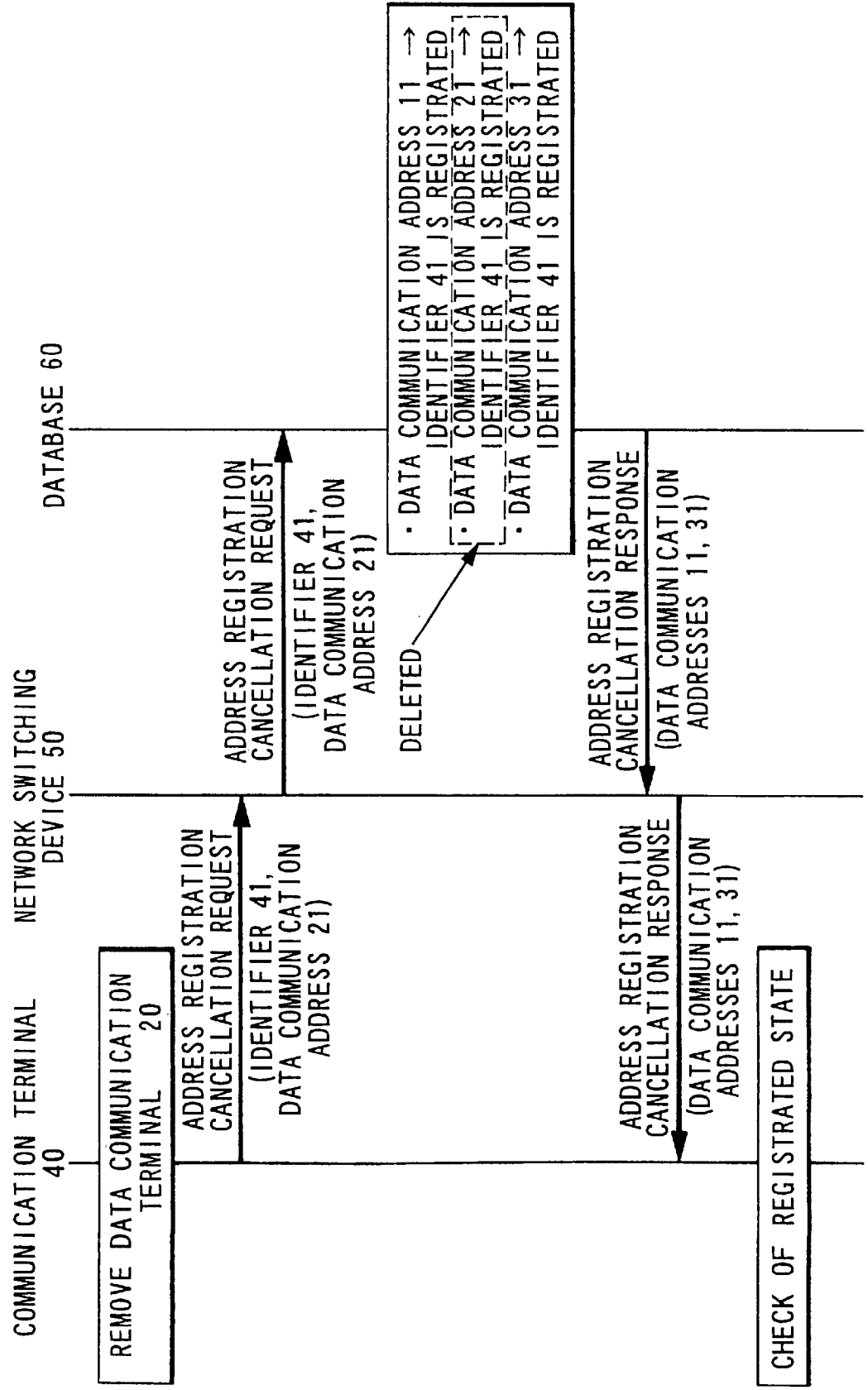

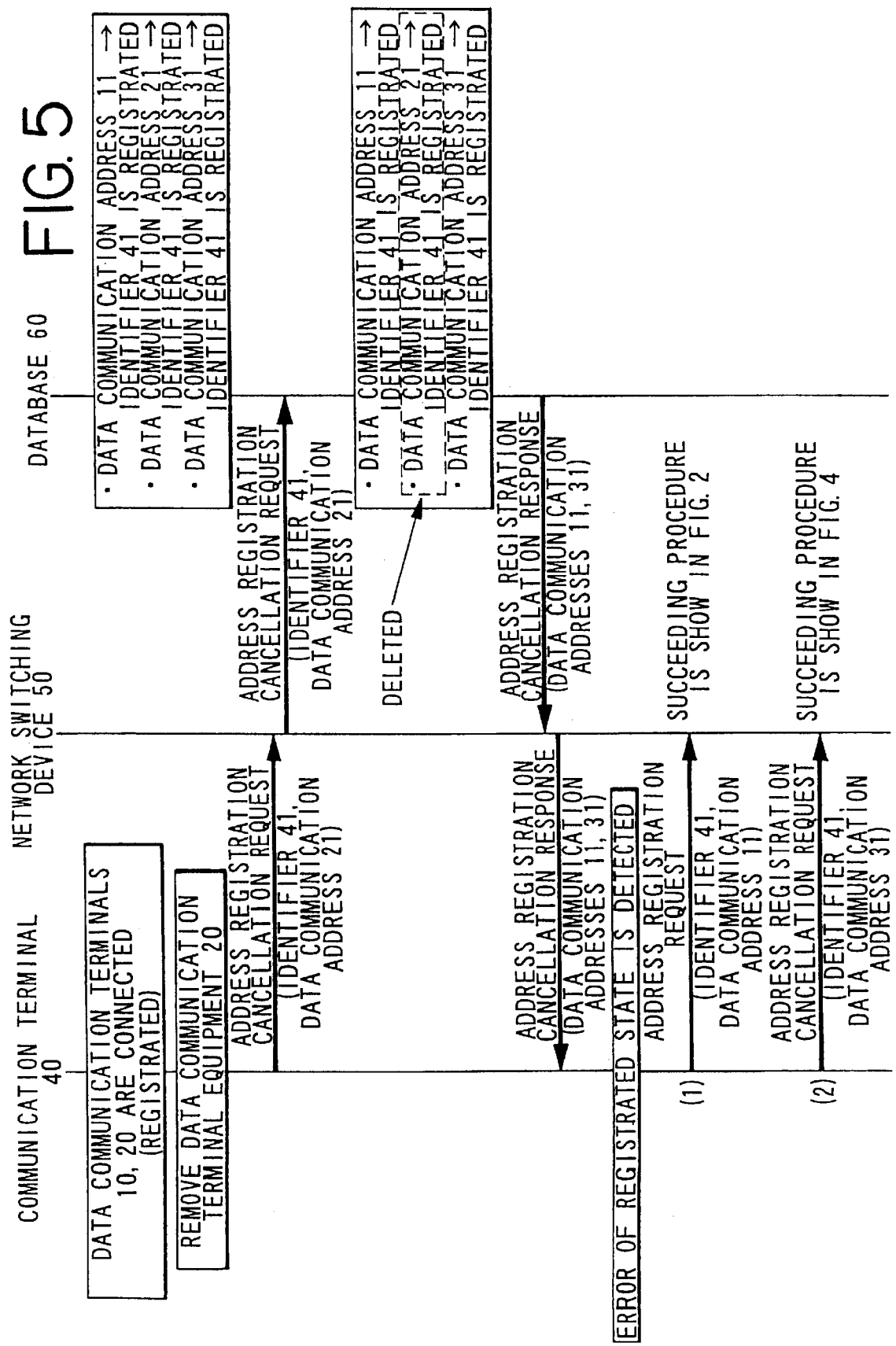

DATA COMMUNICATION SYSTEM AND COMMUNICATION TERMINAL EQUIPMENT

TECHNICAL FIELD

This invention relates to a data communication system in which data communication is performed between communication terminal equipments utilizing unique data communication addresses.

BACKGROUND ART

In a data communication system, each communication terminals has a unique data communication address assigned thereto. For transmitting data from each communication terminal, a destination to which the data are to be transmitted is designated based on the data communication address. In a typical conventional data communication system, such a data communication address is fixed to each communication terminal and a network switching device (i.e., network exchange) determines the destination for the data based solely on the data communication address.

Incidentally, in the data communication system, sometimes a plurality of data terminal equipments are connected to one communication terminal. In this case, since the plurality of data communication terminals are used respectively by plurality of users, the data communication terminals are required to be handled independently. Further, the number of the data communication terminals, which are connected for use respectively to the communication terminal equipments and the data communication addresses for those data communication terminal equipments are changeable in accordance with necessity, taking into consideration convenience of the users of the respective terminals. However, since the conventional data transmission system is operated to control the destination for transmission of data by assigning a specific data communication address to each communication terminal as mentioned above, it apparently lacks versatility to meet such a request.

DISCLOSURE OF INVENTION

The present invention has been accomplished in view of the above situation. It is, therefore, an object of the present invention to provide a data communication system in which a data communication address for a communication terminal can arbitrarily be changed whenever it is used.

First, the subject matter of a first invention resides in a data communication system comprising:

a communication terminal having such a function as being connected to at least one data communication terminal which is assigned with a unique data communication address so as to perform a data communication, or having at least one unique data communication address and further assigned with a unique identifier;

a network switching device for receiving therein a plurality of the communication terminal equipments and adapted to perform an appropriate switching operation between two communication terminal equipments within a local network or between a communication terminal within the local network and a communication terminal within a remote network, the network switching device using an identifier assigned to a communication terminal equipment when the communication terminal is to be called; and a database for storing a corresponding relation between an identifier of a communication terminal to be used for communication and a plurality of data communication addresses;

the database, when a certain communication terminal is used, storing a corresponding relation between an identifier of the certain communication terminal and a data communication address during a period of use thereof, in accordance with instructions from the certain communication terminal equipment;

the network switching device, when an incoming message is received with respect to a certain data communication address, obtaining an identifier corresponding to the certain data communication address with reference to the database and calling the communication terminal using such an obtained identifier so as to transmit data.

According to this first invention, when a communication terminal is used, a relation between data communication addresses and an identifier of the communication terminal equipment is registered (or stored) in a database and a destination for data is determined based on information stored in the database. Accordingly, there can be obtained such an advantageous effect that a communication terminal to be used can arbitrarily be changed for a certain data communication address.

Similarly, the subject matter of a second invention resides in a data communication system wherein when an access is made to the database, a corresponding relation between an identifier of the communication terminal and the certain data communication address registered in the database at that time point is returned, as an answer, to the communication terminal.

According to this second invention, when an access is made to a database, a contents of registration in the database at that time point is notified to a communication terminal. Accordingly, the communication terminal side can immediately detect a discrepancy between the contents of registration in the database and an actual corresponding state between the communication terminal equipment and the data communication address and resolve the discrepancy, if any.

The subject matters of a third and a fourth inventions reside in a provision of a communication terminal necessary for carrying out the first or second invention.

More specifically, the subject matter of the third invention resides in a communication terminal having a unique identifier and having such a function as being connected to a plurality of data communication terminal equipments to perform a data communication, the communication terminal, when a fact is detected revealing that the data communication terminals have been connected, transmitting information of a corresponding relation between the identifier and the data communication address of the data communication terminal and instructions for registering the information to a network switching device, and when a fact is detected revealing that the data communication terminal has been removed, transmitting instructions to the network switching device that the registered corresponding relation between the identifier and the data communication address of the data communication terminal should be canceled.

Similarly, the subject matter of the fourth invention resides in a communication terminal having a unique identifier and having such a function as performing data communication utilizing a plurality of unique data communication terminal equipments, the communication terminal, equipment, when a data communication utilizing a data communication address is to be performed, transmitting information of a corresponding relation between the identifier and the data communication address and instructions for registering the information to a network switching device, and when a data communication using the data communication address is to be finished, transmitting instructions to the network switching device that the registered corresponding relation between the identifier and the data communication address should be canceled.

BRIEF DESCRIPTION OF DRAWINGS

FIG. 1 is a block diagram showing a construction of a data communication system according to one embodiment of the present invention, and FIGS. 2 through 5 are sequence diagrams showing operations of the above embodiment.

BEST MODE FOR CARRYING OUT THE INVENTION

The best mode for carrying out the present invention will now be described with reference to the drawings. First, FIG. 1 is a block diagram showing a construction of a data communication system according to this mode for carrying out the invention. Similarly, FIGS. 2 through 5 are diagrams showing sequential procedures for data communication in this mode for carrying out the invention.

In FIG. 1, data communication terminal equipments 10, 20 and 30 are assigned with date communication addresses 11, 21 and 31, respectively. A communication terminal 40 is assigned with an identifier 41. Here, the communication terminal 40 is designed such that it is connected to the data communication terminals 10, 20 and 30 and performs a data communication in accordance with a predetermined communication procedure. Also, the communication terminal 40 is designed such that it is capable of detecting a fact that the data communication terminals 10, 20 and 30 are connected or removed in accordance with the predetermined communication procedure.

The identifier 41 of the communication terminal equipment 40 is used in order to identify a communication terminal in a communication between the network switching device 50 and the communication terminal 40. A database 60 stores a corresponding relation between the identifier of a communication terminal equipment and data communication addresses assigned to the data communication terminal equipments connected to this communication terminal and renews the corresponding relation in accordance with an address registration request (as later described) from the communication terminal.

In FIG. 1, there is depicted a state in which the data communication addresses 11, 12 and 13 are registered in relation the identifier 41 in the database 60 the data communication address 11, 21 and 31 to the identifier 41 is registered in. Also, it is designed such that a request that the date communication addresses should be converted to a communication terminal identifier is given to the database 60 by the network switching device 50. The database 60 has a function to perform this conversion.

Operation of this data communication system will now be described with reference to FIGS. 2 through 5.

First, when the data communication terminal equipments 10 and 20 are connected with the communication terminal equipment 40, the communication terminal 40 makes an address registration request to the network switching device 50. In this address registration request, there are established the identifier 41 of the communication terminal 40, and the data communication addresses 11 and 21 of the data communication terminal equipments 10 and 20 respectively. Upon receipt of this request, the network switching device 50 makes an address registration request to the database 60. In this address registration request, there are established the identifier 41 of the communication terminal 40, and the data communication addresses 11 and 21 of the data communication terminal equipments 10 and 20 respectively. Upon receipt of this request, the database 60 registers that the identifier 41 (namely, communication terminal 40) in relation to the respective data communication addresses 11 and 21 (FIG. 2).

When there is an incoming datum to the data communication address 11 in the state that the data communication addresses 11 and 21 are registered in the database 60, the network switching device 50 recognizes the incoming datum and asks the database 60 for the identifier of the communication terminal to which the data communication address 11 corresponds. The database 60 notifies the network switching device 50 that the data communication address 41 corresponds to the identifier 11. The network switching device 50 calls the communication terminal 40 based on the identifier 41 and executes a data receiving procedure with the data communication terminal 40.

When the data communication terminal 30 is newly connected to the communication terminal 40, the communication terminal 40 makes an address registration request to the network switching device 50. The address registration request to be made at this time differs depending on whether method a or b noted below is employed to register data communication addresses. The details are as follows. a. A method is employed under which a data communication address is registered in response to an address registration request, and its registration is maintained until a registration cancellation request is raised with respect to the data communication address.

In this case, the communication terminal 40 identifies in the address registration request only the identifier 41 and the data communication address 31 of the data communication terminal 30 newly connected to the communication terminal 40 and transmits the request to the network switching device 50. The data communication addresses 11 and 21 hold in the database 60 may continuously be used. b. A method is employed under which all the data communication addresses currently registered in relation to an identifier are discarded before new data communication addresses identified in an address registration request are registered in relation to the identifier in the database 60.

In this case, the communication terminal 40 identifies in the address registration request the data communication addresses 11, 21 and 31 of all the data communication terminal equipments 10, 20 and 30 connected to the communication terminal 40 and transmits this request to the network switching device 50.

The address registration request thus transmitted to the network switching device 50 is sent from the network switching device 50 to the database 60. As a consequence, the data communication address 31 of the data communication terminal 30 newly connected to the communication terminal 40 is additionally registered in relation identifier 41 in the database 60 (It should be noted, however, that FIG. 3 shows the procedure of the above method a).

If the data communication terminal 20 is removed when the data communication terminal equipments 10, 20 and 30 are connected with the communication terminal 40, the communication terminal 40 sends an address registration cancellation request to the network switching device 50. Receiving this address registration cancellation request, the network switching device 50 makes an address registration cancellation request to the database 60 and the database 60 deletes the data communication address 21 (see FIG. 4).

There may be an error that the corresponding relation between the identifier of the communication terminal 40 and the data communication addresses of the data communication terminal equipments is incorrectly registered in the database 60. To avoid this error, in this mode for carrying out the present invention, when a registration request is made to the database 60 or when a registration cancellation request is made to the database 60, a list of the data communication addresses of the data communication terminal equipments registered in relation to the identifier 41 of the communication terminal 40 in the database 60 is sent from the network switching device 50 to the communication terminal 40 when the requested registration or requested registration cancellation procedure is completed--. (see FIGS. 2 through 4). Then, the communication terminal 40 checks or confirms the list of the data communication addresses of the data communication terminal equipments registered in relation to the identifier 41 included in the received answer signal. If the confirmation result reveals that the contents of the list are different from those of the data communication terminal equipments actually connected to the communication terminal, the communication terminal 40 makes again a registration request or registration cancellation request to the network switching device 50. In contrast, if the contents of the list are coincident with those of the data communication terminal equipments actually connected to the communication terminal, the registration or registration cancellation procedure is finished.

FIG. 5 is a diagram showing how to correct the situation which is created when such a discrepancy has occurred. In this illustration, if the database 60 had not made an error, only the data communication addresses 11 and 21 would have been registered in the database 60 in relation to the identifier 41. because the data communication terminal equipments 10 and 20 are initially connected to the communication terminal 40. However, in this example of FIG. 5, since some trouble occurred to the database 60, the data communication address 31 was by mistake, in addition to the data communication addresses 11 and 21.

In the above-mentioned state, as illustrated, when the data communication terminal 20 is removed and a resultant address registration cancellation request is made by the communication terminal 40 to the database 60 through the network switching device 50, the registration of the data communication address 21 in the database 60 is canceled and the remaining data communication addresses 11 and 31 are sent to the communication terminal 40.

Here, since the communication terminal equipment 40 is connected with only the data communication terminal 10, the former detects a discrepancy between the information in the database 60 and the current state of connection of the data communication terminals. Then, the communication terminal 40 makes an address registration request or address registration cancellation request to the network switching device 50 in order to register correct information. The procedure how to cope with the situation differs depending on whether the above-mentioned address registration method a or b is employed by the database 60. Again, under the method a, a data communication address is registered in response to an address registration request, and its registration is maintained until a registration cancellation request is raised with respect to the data communication address. Under the method b, all the data communication addresses currently registered in relation to an identifier are discarded before new data communication addresses identified in an address registration request are registered in relation to the identifier in the database 60.

(1) First, in the case the database 60 employs the address registration method b, the communication terminal 40 sends to the database 60 via the network switching device 50 an address registration request, in which the data communication address 11 of the currently connected data communication terminal 10 is identified.

(2) On the other hand, in the case the database 60 employs the address registration method a, the communication terminal 40 sends to the database 60 via the network switching device 50 an address registration cancellation request for canceling the data communication address 31, which is somehow registered in the database 60.

After the above procedures are executed only the data communication address 11 is registered corresponding to the identifier 41 in the database 60.

The above mentioned mode for carrying out the present invention is explained with the example in which the data communication terminal equipments 10, 20 and 30 are connected to the communication terminal 40. However, it should be noted that an arrangement is acceptable in which the communication terminal 40 selectively uses one or some of a plurality of data communication addresses irrespective of the presence or absence of such data communication terminal. That is, before performing a data communication using a certain data communication address, the communication terminal 40 sends to the network switching device 50 information indicative of a corresponding relation between the identifier 41 and the certain data communication address, and instructs it to register the information. On the other hand, after finishing the data communication using the certain data communication address, the communication terminal 40 sends to the network switching device 50 instructions that the registration of the information indicative of a corresponding relation between the identifier 41 and the certain data communication address should be canceled. By adding such a function to the communication terminal 40, the data communication system becomes easier to handle.

We claim:

1. A data communication system for managing dada transmissions among a plurality of data communication terminals each having a unique data communication address, comprising:

(a) a plurality of communication terminals each having a unique identifier for communicating through a communication path with another communication terminal within the same data communication system or within another data communication system, each communication terminal having at least one data communication terminal connected thereto;

(b) a database for registering therein said data communication addresses in relation to said identifiers in such a manner as to show correlations between each communication terminal and data communication terminals connected thereto, a communication terminal requesting registration of a new data communication address in said database when a data communication terminal having the new data communication address is newly connected to the communication terminal, in response to the request, said database registering therein the new data communication addresses in relation to the identifier of the communication terminal; and (c) a network switching device for establishing said communication path in such a manner that when there is incoming data designated to a data communication address, said network switching device searches said database to locate an identifier registered in relation to the designated data communication address and calls the communication terminal having the located identifier.

2. A data communication system according to claim 1, wherein
- a communication terminal requests cancellation of the new data communication address from said database when the newly connected data communication terminal is disconnected from the communication terminal, and
- in response to the request, said database cancels therefrom the new data communication addresses.

3. A data communication system according to claim 2, wherein when requesting registration of the new data communication address in said database,
- said communication terminal requests registration of the data communication addresses, including the new communication address, of all the data communication terminals being connected to itself, and
- in response to the request, said database clears therefrom all the data communication addresses registered in relation to the identifier of the communication terminal before registering the requested data communication addresses therein.

4. A data communication system according to claims 2, wherein after the registration or the cancellation of the new data communication address, the communication terminal is notified of an update of the data communication addresses registered in relation to the identifier of itself and, in reply, requests correction of the registration in said database as to any discrepancy between the notified data communication addresses and the data communication addresses of data communication terminals being actually connected to itself.

5. A method of managing data transmissions among a plurality of data communication terminals each having a unique data communication address, said method comprising the steps of:
- (a) providing a plurality of communication terminals each having a unique identifier for communicating through a communication path with another communication terminal within the same data communication system or in another data communication system;
- (b) connecting at least one data communication terminal to each of said plurality of communication terminals;
- (c) requesting registration of said data communication addresses in a database, the request for registering a new data communication address being made by a communication terminal when the data communication terminal having the new data communication address is newly connected to the communication terminal;
- (d) in response to the request, registering the new data communication address in said database in relation to the identifier of the communication terminal; and
- (e) establishing said communication path in such a manner that when there is incoming data designated to a data communication address, said database is searched to locate an identifier registered in relation to the designated data communication address and a call is made to the communication terminal having the located identifier.

6. A data communication method according to claim 5, further including the steps of:
- requesting by the communication terminal cancellation of the new data communication address from said database when the newly connected data communication terminal is disconnected from the communication terminal, and
- in response to the request, canceling the new data communication address from said database.

7. A data communication method according to claim 6, further including the steps of:
- clearing from said database all the data communication addresses registered in relation to the identifier of the communication terminal; and
- registering the data communication addresses, including the new data communication address, of all the data communication terminals being connected to the communication terminal.

8. A data communication method according to claims 6, further including the steps of:
- after the new data communication address is registered or canceled, notifying the communication terminal of an update of the data communication addresses registered in relation to the identifier of the communication terminal, and
- correcting the registration in said database at the request of the communication terminal as to any discrepancy between the notified data communication addresses and the data communication addresses of data communication terminals being actually connected to the communication terminal.

9. A data communication system for managing data transmissions among data communication addresses, comprising:
- (a) a plurality of communication terminals each having a unique identifier for communicating through a communication path with another communication terminal within the same data communication system or within another data communication system, each communication terminal having a certain number of arbitrarily selected data communication addresses;
- (b) a certain number of data communication terminals connected to each of said plurality of communication terminals, each data communication terminal having a unique data communication address;
- (c) a database for registering therein said data communication addresses in relation to said identifiers in such a manner as to show correlations of each communication terminal with data communication addresses arbitrarily selected thereby and data communication terminals connected thereto; and
- (d) a network switching device for establishing said communication path in such a manner that when there is incoming data designated to a data communication address, said network switching device searches said database to locate an identifier registered in relation to the designated data communication address and calls the communication terminal having the located identifier.

* * * * *

UNITED STATES PATENT AND TRADEMARK OFFICE
CERTIFICATE OF CORRECTION

PATENT NO. : 6,031,839
DATED : February 29, 2000
INVENTOR(S) : Shoichi Hirata et al.

It is certified that error appears in the above-identified patent and that said Letters Patent is hereby corrected as shown below:

<u>On the Title Page</u>

In column 1, item [73], after "Network", please insert --Inc.--

In column 2, line 12, under "ABSTRACT", after "to" please insert --a--.

<u>In the Claims</u>

In claim 1, line 1, please change "dada" to --data--.

In claim 4, line 1, please change "claims" to --claim--.

In claim 8, line 1, please change "claims" to --claim--.

Signed and Sealed this

Thirteenth Day of March, 2001

Attest:

NICHOLAS P. GODICI

*Attesting Officer*        *Acting Director of the United States Patent and Trademark Office*